Nov. 13, 1951 W. SLUYTER 2,574,668
HOSE UNCOUPLING SYSTEM
Filed Dec. 17, 1947
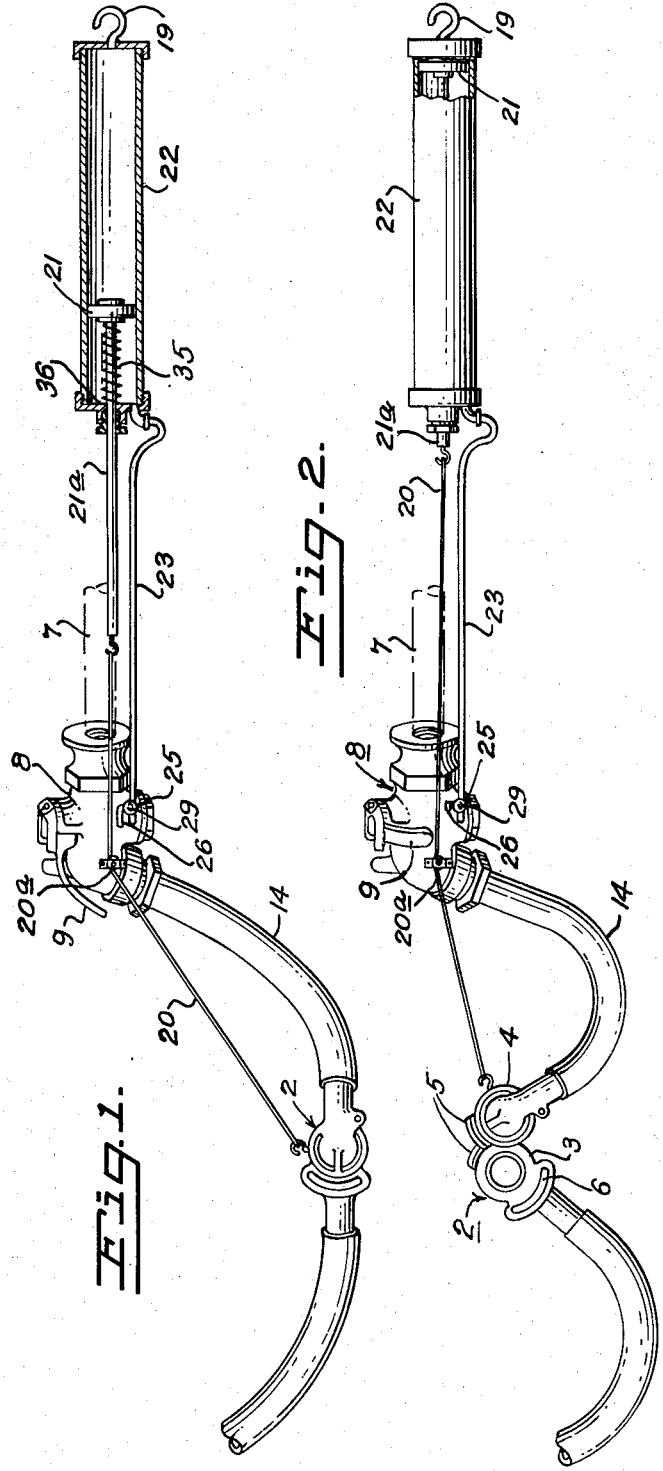
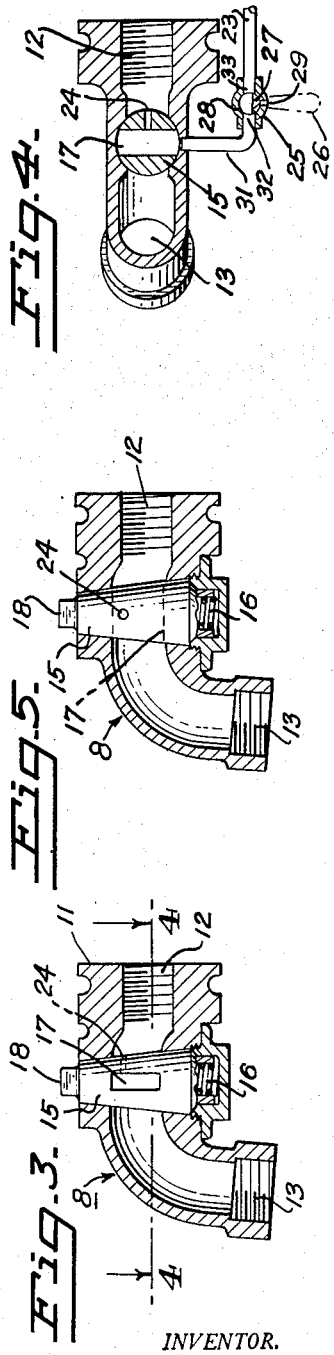
INVENTOR.
WILLIAM SLUYTER
BY
ATTORNEY Patented Nov. 13, 1951

2,574,668

UNITED STATES PATENT OFFICE 2,574,668

HOSE UNCOUPLING SYSTEM

William Sluyter, Eureka, Calif.

Application December 17, 1947, Serial No. 792,133

9 Claims. (Cl. 137—78)

This invention relates to a device for uncoupling an air hose connection between two vehicles, and more particularly to a device for uncoupling a conventional or standard type air hose coupling or connection between adjacent railroad cars in a train of said cars.

Air brakes and other air operated accessories constitute a part of standard operating equipment on conventional type railroad passenger and freight cars in use today. The primary supply of air under pressure for operating the air brakes and accessories originates at a compressor source, generally mounted on the locomotive, and from the compressor source the air is piped to each car in the train. Flexible air hose connections are made between adjacent cars in the train by providing bayonet type couplings on the flexible hoses which are adapted for air tight locking engagement in a manner to be more fully described hereinafter.

Although railroad regulations generally require that the uncoupling of the air hoses to be accomplished by manual disconnection of the flexible hose at its coupling, such a practice requires some considerable human effort in view of the fact that from 70 to 90 pounds per square inch of air pressure is left remaining within the flexible hose and coupling, even after the supply of air from the main compressor source has been cut off. Very often in actual practice railroad employees, for one reason or another, will effect the uncoupling of an air hose between two railroad cars or between a locomotive and adjacent car by causing the coupling to be virtually pulled apart by movement of one railroad car away from an adjacent stationary car. Disconnecting air hoses in this latter manner is not only a violation of railroad regulations, but it may very often result in serious injury to the air hoses, hose gaskets, or couplings, and the like.

Generally, railroad passenger cars and locomotive cars are provided with brackets in order that the ends of uncoupled flexible hoses are supported well above the ground. Quite often in practice the hoses are not properly positioned on the brackets, and therefore they slip off causing the hose ends to be dragged along the ground with resulting damage to the coupling fittings. In addition, when the open hose ends are permitted to touch the ground, dust and grit are likely to find their way into the air hose and eventually into the air brakes and equipment proper, with damaging results.

One of the principal objects of my invention is to overcome the attendant difficulties and disadvantages in manually uncoupling air hose connections between railroad cars as above outlined. The present invention comprises a mechanical air hose uncoupling device which totally eliminates the necessity for manually handling an air hose coupling in order to disconnect the same. Furthermore, the device is adapted to retain the free or uncoupled end of an air hose in a position well above the ground, thereby abrogating the possibility of the hose dragging on the ground and being damaged, and reducing the possibilities that dust and grit will find their way into the coupling mechanism or air equipment.

Another object of my invention is to provide an air hose uncoupling device which is incapable of operation so long as air under pressure is being supplied to the coupling from a compressor source.

Another object of my invention is to provide novel means for bringing the coupling fittings provided on the ends of the flexible hoses into approximate registry with one another when it is desired to make air hose connections between two vehicles.

Other objects of this invention are to provide an uncoupling device which is relatively inexpensive to manufacture, easy to install, and simple and safe to operate.

Further objects of this invention will become apparent by reading the specification and referring to the accompanying drawings in which similar characters of reference represent corresponding parts in each of the several views.

Fig. 1 is a side elevational view, partially in section, of my invention, and showing the manner of its employment with an air hose in coupled position.

Fig. 2 is the same as Fig. 1 showing the air hose in uncoupled position and with the cylinder partially broken away.

Fig. 3 is a longitudinal sectional view of the main air cock with the valve plug in the closed position.

Fig. 4 is a sectional view of the air cock taken on line 4—4 of Fig. 3.

Fig. 5 is a view similar to Fig. 3 with the valve plug in open position.

Referring more specifically to the drawings, a conventional type coupling for air hose connection between two railroad cars is indicated generally at 2. The coupling is of the bayonet type and comprises essentially a fitting 3, adapted to register with a complimentary fitting 4. Projecting lugs 5 are provided on each of the members 3 and 4 and are adapted to engage in an obvious manner lug slideways 6 which are correspondingly provided on each of the members 3 and 4. It is apparent that by moving the members 3 and 4 from a position as indicated in Fig. 1 to a position as indicated in Fig. 2, the projecting lugs 5 will be disengaged from slideways 6 and uncoupling of the air hose is effected.

Each conventional railroad car is provided with a main air or brake pipe, as indicated in dotted lines at 7, which extends the length of the railroad car and to which air under pressure is supplied from a compressor source usually mounted on a locomotive. At each end of a railroad car's main air pipe 7 a main air cock 8 having a handle 9 is provided for regulating and controlling the supply of air from one railroad vehicle to another. In train operation all of the main air cocks are turned to open position as indicated in Fig. 5 in order that air communication between the locomotive and the last car in the train may be established.

When it is desired to uncouple an air hose connection between two railroad vehicles, the main air cocks adjacent the coupling are closed in order that the air supply from the main air pipes of the respective cars is shut off and air under pressure is trapped in the said main air lines.

An air cock 8 is illustrated in the accompanying drawings and comprises essentially a housing 11, a threaded orifice 12 for connection to the main air pipe of the railroad car, another threaded orifice 13 adapted for threaded engagement with a flexible hose length 14, and a cone shaped valve plug 15. Valve plug 15 is normally tightly seated by action of spring 16 acting on the underside thereof. Plug 15 is provided with a main air port 17, and an extending lug 18 to coact with handle 9 to rotate therewith. It is apparent that regulation of air communication between orifice 12 and orifice 13 is dependent upon the turning of plug 15 to bring air port 17 into fluid communication with orifices 12 and 13, as indicated in Fig. 5, or non-fluid communication with said orifices as indicated in Fig. 3 and Fig. 4. The description of the main air cock per se, as hereinabove appears, is illustrative of a standard type air cock provided on railroad cars and locomotives as a part of standard operating equipment.

An air cylinder 22, having a piston 21 disposed slidably therein, is rigidly mounted to the railroad car (not shown) by anchor hook 19, or by other suitable means. Piston rod connection to air hose coupling 2 is established by flexible cable or wire cord 20. It is apparent from an examination of Fig. 1 and Fig. 2 that air supplied to cylinder 22, from air cock 8 via conduit 23 will cause the piston 21 and rod 21a to reciprocate in the cylinder from a position indicated in Fig. 1 to a position indicated in Fig. 2 thereby causing flexible cable 20 to pull upwardly, through guide pulley 20a mounted on cock 8, on coupling member 4 and effect an uncoupling of the air hose connection as aforesaid.

Following is a description of the normal means which is successfully employed to supply air from air cock 8 to cylinder 22. A small air port 24 is provided in the upper portion of valve plug 15 in communication with main port 17. The air port 24 is disposed at right angles to the main air port 17 and in such manner that when the plug 15 is turned to closed position to shut off the supply of air to orifice 13 as aforesaid, air communication from orifice 12 to main air port 17 is established, as indicated in Fig. 4. A threaded bore is provided in valve housing 11 adjacent the lower portion thereof. The bore receives a pipe 31, which pipe is connected to air valve 25 and establishes flow communication between valve 25 and the main air port 17 of cock 8 when plug 15 is rotated to closed position (Figs. 3 and 4). Valve 25 is provided with a handle 26 which is adapted to turn a semi-circular valve plug 27 which is rotably seated in the valve seat 28 of said valve 25. The valve 25 is provided with oppositely disposed openings 32 and 33 to which pipe 31 and conduit 23 are respectively connected.

Plug 27 is illustrated in open position in Fig. 4; i. e., air communication is established between conduit 23, leading to cylinder 22, and main air port 17 of valve plug 15 and main pipe 7. When valve handle 26 is turned from open position as illustrated in Fig. 2 to closed position as indicated in Fig. 1, semi-circular valve plug 27 will be correspondingly moved to close off air communication between conduit 23 and main air port 17 through pipe 31, and simultaneously permit air communication between conduit 23 and atmosphere through vent 29 provided in the valve body at right angles to openings 32 and 33.

In operation, when it is desired to uncouple the hose connection between two vehicles handle 9 on air cock 8 is turned to closed position, as in Fig. 3, to shut off the air supply remaining in the main air pipe 7 to coupling 2. Closing of air cock 8 in the above manner also operates to establish air communication from main air pipe 7 through orifice 12, air port 24, main air port 17, to valve 25 which is normally in closed position as indicated in Fig. 1. Valve handle 26 then is turned to open position, as indicated in Figs. 2 and 4, and the air under pressure is thereby allowed to communicate to cylinder 22 for actuation of piston 21, which in turn moves flexible cable 20 and effects the uncoupling of the hose connection as has hereinabove been described.

Conversely, when it is desired to effect a coupling of the hose connection, handle 26 on valve 25 is turned to closed position as indicated in Fig. 1 to shut off the supply of air from air cock 8 to cylinder 22, and to allow simultaneously the compressed air remaining in the cylinder to escape via conduit 23 and escape port 29. When the air escapes from cylinder 22, flexible hose 14 and coupling member 4 will drop to the approximate position indicated in Fig. 1 and in which said position member 4 can be easily, manually, coupled together with member 3 as aforesaid. Air cock 8 may then be opened, and air communication between two vehicles is then consummated.

An helical spring 35, anchored to cylinder 22 as at 36 may be provided on piston rod 21a to bias normally the piston 21 to inoperative position (Fig. 1) and also serves to cushion the piston from striking the cylinder end when air is released from the cylinder for coupling as above set forth. The helical spring also serves to allow a certain amount of slack play in connecting member 20, and thus eliminates any possibility that a sudden jerk of the coupling during train movement could cause the member 23 to snap or break due to the sudden application of a tensional strain thereon.

It should be noted that by providing air port 24 near the upper extremity of valve plug 15 and providing valve fitting 25 near the lower extremity of the air cock housing 11 and out of air registry with air port 24, air communication between air cock 8 and cylinder 22 is impossible when air cock 8 is open and pressure is being supplied to the coupling 2. In short, it is impossible to uncouple an air hose connection between two vehicles employing my invention until the air supply to the coupling has completely shut off.

Although for purposes of illustration I have shown and described my air actuated uncoupling device as comprising a piston and cylinder with piston rod connection to the air hose coupling, it is understood that other air actuated means, such as an air powered winch, having an operative connection with the coupling could be substituted by those skilled in the art in lieu of the reciprocable piston and cylinder as described.

It should be further pointed out that although I have shown my uncoupling device as having an operative connection to only the uncoupling member 4, it is contemplated that in actual practice each flexible hose fitting, such as indicated by members 3 and 4 in the drawings, will be operatively connected to air actuated devices such as I have described mounted on each end of every railroad vehicle having flexible hose connection means such as above set forth.

Although I have described my invention in detail for purposes of clarity by way of example and illustration, it will be understood that certain modifications and additions in structure, assembly and use may be made within the spirit of the invention and the scope of the appended claims.

I claim:

1. A separable hose uncoupling system comprising a source of gas under pressure, a separable hose connection movable to a coupling position and an uncoupled position, means including valve means to open and close communication between said source of gas under pressure and said separable connection, a gas actuated mechanism operatively linked to said separable hose connection and arranged and constructed to move said separable hose connection to its uncoupled position upon gas under pressure being supplied to said gas actuated mechanism and to move said separable hose connection to its coupling position upon gas under pressure being exhausted therefrom, means comprising said valve means to supply gas under pressure to said gas actuated mechanism, and means to exhaust gas from said gas actuated mechanism.

2. A separable hose uncoupling system comprising a source of gas under pressure, a separable hose connection movable to a coupling position and an uncoupled position, valve means to open and close communication between said source of gas under pressure and said separable connection, a gas actuated mechanism operatively linked to said separable hose connection and arranged and constructed to move said separable hose connection to its uncoupled position upon gas under pressure being supplied to said gas actuated mechanism and move said separable hose connection to its coupling position upon gas under pressure being exhausted therefrom, means comprising said valve means operable to supply gas under pressure from the said source thereof to said gas actuated mechanism only when said valve means has been operated to close communication between said separable hose connection and said source of gas under pressure, and means to exhaust gas from said gas actuated mechanism.

3. An uncoupling system according to claim 2 and wherein said gas actuated mechanism comprises a gas actuated piston and cylinder having its piston operatively linked to said separable coupling by a flexible connecting member.

4. A separable hose uncoupling system comprising, a source of gas under pressure, a gas conduit connected to said source of gas under pressure and comprising a separable hose connection adapted to be disposed between and supported by two adjacent coupled vehicles, said separable hose connection movable to an uncoupled position and to a coupling position, valve means to open and close communication between said separable hose connection and the source of gas under pressure, a gas actuated mechanism adapted to be supported by one of the vehicles operatively linked to said separable hose connection, said gas actuated mechanism arranged to move said separable hose connection to its uncoupled position upon gas under pressure being supplied thereto and to move said separable hose connection to its coupling position upon gas under pressure being exhausted therefrom, means comprising said valve means operable to supply gas under pressure to said gas actuated mechanism only when said valve means has been operated to close communication between said separable hose connection and said source of gas under pressure, and means including said last named means to exhaust gas from said gas actuated mechanism.

5. A separable hose uncoupling system according to claim 4 and wherein said separable hose connection comprises a bayonet type coupling movable upwardly to its uncoupled position and downwardly to its coupling position, and wherein said gas actuated mechanism is arranged to move said bayonet coupling upwardly upon gas under pressure being supplied thereto and to move said bayonet type coupling downwardly upon gas under pressure being exhausted therefrom.

6. A separable hose uncoupling system according to claim 4 and wherein said gas actuated mechanism comprises a cylinder attached stationary with respect to one of said vehicles and supporting a slidable gas actuated piston therein, and wherein a flexible member connects said piston with said separable hose connection.

7. A separable hose uncoupling system comprising a separable hose connection movable to an uncoupled position and to a coupling position, a source of gas under pressure, a valve comprising a valve housing having a first orifice in one end thereof and a second orifice in the opposite end thereof in axial alignment with said first orifice, said first orifice in flow communication with the interior of said housing and with said source of gas under pressure, said second orifice in flow communication with the interior of said housing and with said separable hose connection, a gas actuated mechanism linked operatively to said separable hose connection and arranged to move upon gas under pressure being supplied thereto said separable hose connection to its uncoupled position and to move upon gas being exhausted therefrom said separable hose connection to a coupling position, a third orifice in said valve housing disposed normal to the axes of said first and second orifices in communication with the interior of said housing and with said air actuated mechanism, means comprising a movable valve plug disposed in the interior of said housing operable selectively to open and close communication between said source of gas under pressure and said separable hose connection via said valve plug and said first and second orifices and to open and close communication between said source of gas under pressure and said air actuated mechanism via said valve plug and said first and third orifices, said last named means arranged and constructed to establish gas communication between said source of gas under pressure and said separable hose connection only when communication between said source of gas under pressure and said air actuated mechanism is closed, and means to exhaust gas from said air actuated mechanism.

8. An uncoupling system according to claim 7 and wherein said last named means comprises a rotatable valve plug having a port extending therethrough in one direction and a vent disposed normal to said port and communicating between said port and an exterior side of said plug, said plug rotatable selectively to a first position whereat said port is aligned between said first and second orifices to establish flow communication therebetween and to a second position approximately 90° angularly removed from said first position whereat said vent is aligned with said first orifice and one end of said port is aligned with said third orifice to establish flow communication between said first and third orifices through said vent and said port.

9. An uncoupling system according to claim 7 and wherein said gas actuated mechanism comprises a cylinder supported stationary with respect to said separable hose connection and a gas actuated piston mounted slidably therein, and wherein said piston is linked operatively to said separable hose connection by a flexible connecting member.

WILLIAM SLUYTER.

REFERENCES CITED

The following references are of record in the file of this patent:

UNITED STATES PATENTS

| Number | Name | Date |
|--------|------|------|
| 454,909 | Irvin | June 30, 1891 |